United States Patent
Ton-That et al.

(10) Patent No.: US 7,220,484 B2
(45) Date of Patent: May 22, 2007

(54) POLYMERIC NANOCOMPOSITES COMPRISING EPOXY-FUNCTIONALIZED GRAFT POLYMER

(75) Inventors: Minh-Tan Ton-That, Montreal (CA); Lechoslaw Adam Utracki, Pierrefonds (CA); Kenneth Cole, St-Hubert (CA); Johanne Denault, Longueuil (CA)

(73) Assignee: National Research Council of Canada, Ottawa (CA)

( * ) Notice: Subject to any disclaimer, the term of this patent is extended or adjusted under 35 U.S.C. 154(b) by 669 days.

(21) Appl. No.: 10/715,438

(22) Filed: Nov. 19, 2003

(65) Prior Publication Data

US 2005/0191490 A1    Sep. 1, 2005

Related U.S. Application Data

(60) Provisional application No. 60/428,253, filed on Nov. 22, 2002.

(51) Int. Cl.
*B32B 5/16* (2006.01)
(52) U.S. Cl. ............ 428/407; 523/206; 523/209; 523/436
(58) Field of Classification Search .......... 523/203, 523/209, 436, 206; 428/407, 403
See application file for complete search history.

(56) References Cited

U.S. PATENT DOCUMENTS

| | | | |
|---|---|---|---|
| 4,335,028 A * | 6/1982 | Ting et al. | 524/504 |
| 5,091,462 A | 2/1992 | Osamu et al. | |
| 5,760,106 A | 6/1998 | Pinnavaia et al. | |
| 5,973,053 A | 10/1999 | Usuki et al. | |
| 6,117,932 A | 9/2000 | Hasegawa et al. | |
| 6,239,195 B1 | 5/2001 | Suzuki et al. | |
| 6,251,980 B1 * | 6/2001 | Lan et al. | 524/445 |
| 6,271,297 B1 | 8/2001 | Ishida | |
| 6,384,121 B1 * | 5/2002 | Barbee et al. | 524/445 |
| 6,552,113 B2 * | 4/2003 | Bagrodia et al. | 524/445 |
| 6,586,500 B2 * | 7/2003 | Bagrodia et al. | 523/209 |
| 6,653,388 B1 * | 11/2003 | Barbee et al. | 524/445 |
| 6,770,696 B1 * | 8/2004 | Ko et al. | 524/445 |

OTHER PUBLICATIONS

Hay et al., "Clay-Based Nanocomposites", Azom.com, 2000.*
Kenny et al., "Processing, Structure and Properties of Polymer Matrix Nanocomposites for Industrial Applications", China-EU Forum on Nanosized Technology, p. 24-37, Dec. 2002.*
Balakrishnan et al., "Chemically Functionalized Clay Epoxy Nanocomposites for Aerospace Applications", Nanotech 2003, vol. 3.*
P. Reichert et al., *Macromol. Mater. Eng.*, 275, 8-17 (2000).
A. Usuki et al., *J. Appl. Polym. Sci.*, 63, 137 (1997).
M. Kawasumi et al., *Macromolecules*, 30, 6333 (1997).

* cited by examiner

*Primary Examiner*—H. Thi Le
(74) *Attorney, Agent, or Firm*—J. Wayne Anderson

(57) ABSTRACT

Disclosed is a nanocomposite comprising a nano-reinforcing material (e.g., layered clay), a polymer matrix (e.g., a polyolefin), and, an epoxy-functionalized graft polymer compatible with the polymer matrix (e.g., epoxy-grafted polyolefin). Such nanocomposites are useful in the fabrication of a variety of materials including parts for the transportation and packaging industries, electronics, business equipment, building and construction materials.

49 Claims, 1 Drawing Sheet

POLYMERIC NANOCOMPOSITES COMPRISING EPOXY-FUNCTIONALIZED GRAFT POLYMER

CROSS-REFERENCE APPLICATIONS

This application claims the benefit of U.S. Provisional Application Ser. No. 60/428,253 filed Nov. 22, 2002.

FIELD OF THE INVENTION

This invention relates to nanocomposite compositions, methods for their preparation and uses thereof.

BACKGROUND OF THE INVENTION

There is a great deal of interest in polymeric nanocomposites because of their improved properties over other types of polymer composites when combined with a nano-reinforcing material. The most interesting nano-reinforcing materials include layered clays, such as natural or synthetic silicates, and nano-fibers like cellulosic nano-fibers, carbon-nanotubes, metal-oxide nanotubes, to name a few. Among them, polymer/clay nanocomposites have received much attention because of a noticeable increase in physical properties and performance characteristics without sacrificing their processability. Some of these properties include dimensional stability, heat distortion temperature, stiffness, strength, flame resistance, barrier properties, ion conductivity, optical properties, thermal stability, and impact resistance.

However, one of the major drawbacks associated with these nanocomposites has been in their preparation due to the low level of interaction that occurs between the essentially non-polar hydrophobic polymers (e.g., polyolefins (PO) and polystyrene (PS)), or weakly polar polymers (for example, polyamides (PA) and polyesters (PEST)) and the hydrophilic nanoclay surfaces. This low level of interaction between the two components can lead to poor dispersion of the clay material within the polymeric matrix and poor interface interaction between them, resulting in a reduction in the overall performance of the nanocomposites.

A number of techniques have been described for attempting to overcome the poor dispersion of the layered material into the polymeric matrix. The basic procedure includes intercalation of the layered clay material followed by exfoliation within the polymer matrix. Intercalation involves the insertion of molecules, known as intercalants, between platelet particles of the clay material thereby increasing the interlayer spacing (i.e., spacing of the clay platelet in a stack, determined by X-ray diffraction analysis as $d_{001}$) to at least 1.5 nm. Accordingly, the intercalant has to be able to infiltrate between the layers of the clay material and penetrate the interstices or the clay galleries to render the hydrophilic clay surfaces more organophilic. A gallery is the space between two adjacent platelets, with the gallery spacing equal to $d_{001}$ less the thickness of the clay platelet. Intercalants that are used for this purpose include polar or hydrophilic solvents, monomers or polymers, inorganic cations, and organic cations, such as quaternary, ternary, secondary or primary ammonium, phosphonium, or sulfonium. Intercalants should bond to the clay surface to ensure that they do not migrate out of the galleries and cause the galleries to collapse during compounding of the nanocomposite. Intercalants are desirable to maximize the interlayer distance between the platelet particles so that they eventually help the exfoliation of the clay into the polymer matrix, which further promotes the benefits brought about by the addition of the layered clay material to the polymer matrix.

Exfoliation of the intercalated clay particles is a process whereby the interlayer distance between individual platelets dispersed within the polymer matrix becomes greater than about 8.8 nm. At this interlayer distance, the desired performance characteristics afforded by the clay material are achieved, while maintaining certain properties that are inherent to the pristine polymer, such as glass-like transparency.

The preparation of a nanocomposite by the melt compounding process as described in WO 00/34393 (Barbee et al.) combines a polymer and a concentrate comprising a layered clay material with a matrix polymer-compatible functionalized oligomer or polymer. The functionalized oligomer or polymer specifically contains an onium group, preferably an ammonium group (e.g., Jeffamines, Etomeens or another modified polymer or oligomer) that provides for increased intercalation of the clay material. However, using molten polymer, as opposed to polymer in solution, leads to poorer and less controllable interaction between the onium group and the clay, adversely affecting the properties of the nanocomposite.

Another technique, which is typically used in conjunction with intercalation and exfoliation, is the use of secondary intercalants or compatibilizers. For instance, U.S. Pat. No. 5,973,053 (Usuki et al.) describes the use of main guest molecules having a polar group in a main chain and/or side chain as extended intercalants. It is essential that the guest molecule possess a polar group (e.g., hydroxyl, halogen, carboxyl, anhydrous carboxylic acid, thiol, epoxy, amino group) to bond to the organoclay surface. Thus, the guest molecule remains in the interlayer section of the clay mineral without being eliminated due to the polarity, thereby allowing the interlayer distance to expand sufficiently. However, Usuki et al. have given little consideration to the effect of the reactivity and structure of the guest molecule on the interaction between the clay and the polymer matrix. In addition, great loss of ductility of nanocomposites using such compatibilizers has also been cited in the literature, for example, in P. Reichert, H. Nitz, S. Klinke, R. Brandsch, R. Thimann and R. Mülhaupt, *Macromol. Mater. Eng.*, 275, 8-17 (2000).

U.S. Pat. No. 6,271,297 (Ishida) describes the use of a swelling agent, in particular epoxy monomers, caprolactam, or a combination thereof to promote the intercalation and/or exfoliation of a sheet silicate and/or sheet silicone. However, little consideration has been given to the compatibility between such guest molecules/swelling agents and the polymer matrix, which plays a very important role in the reinforcing effect of the nano-reinforcement.

U.S. Pat. No. 6,239,195 (Suzuki et al.) describes the use of silanes as compatibilizers in nanocomposites, wherein a phyllosilicate is pre-treated with a silane compound following intercalation of the phyllosilicate, which treatment further expands the interlayer spacing, thereby facilitating exfoliation. However, this process is more expensive and less practical.

Modified polymers, such as maleic-anhydride-grafted polymers (MA-g-polymers), or copolymers, such as styrene-maleic anhydride copolymers (SMA) are popular compatibilizers or coupling agents for conventional polymeric composites and blends. The use of such polar functional oligomers as compatibilizers in nano-silicate systems has been described. For instance, the use of a hydroxy-functionalized polypropylene oligomer and an organoclay in the preparation of a polypropylene/clay nanocomposite has been disclosed by A. Usuki, M. Kato, T. Kurauchi, *J. Appl. Polym. Sci.*, 63, 137 (1997). The use of polypropylene, a maleic anhydride-modified polypropylene oligomer and stearyl-ammonium-intercalated clay in the preparation of a polypropylene/clay nanocomposite was disclosed by M. Kawasumi, N. Hasegawa, M. Kato, A. Usuki and A. Okada, *Macromolecules,* 30, 6333 (1997). However, such coupling agents are not well suited as compatibilizers for use in nanocomposite systems, which have a different interaction mechanism and chemistry compared to conventional systems. At low concentrations of the polar groups, these compatibilizers have been known to be ineffective, while at high concentrations, they may form a separate phase thus contributing to undesirable properties which affect the overall performance of the nanocomposites. As a result, such nanocomposites may be less tough and ductile, have poor thermal stability, and lack the desired color.

To optimize the interaction between the non-polar hydrophobic polymer matrix and the hydrophilic nanoclay platelets it is desirable to design a new type of compatibilizer having a suitable structure and chemistry for the formation of nanocomposite systems.

In the context of the above discussion, compatibilizer means an agent capable of interacting with hydrophilic nano-reinforcing materials and at the same time being miscible or thermodynamically compatible with hydrophobic polymer matrices. In this the present application, the word "compatible" is used to indicate either a thermodynamic miscibility of the organic components or positive interactions between the organic and inorganic components, which results in a non-positive value of the free energy of mixing.

SUMMARY OF THE INVENTION

According to the present invention, there is provided a nanocomposite comprising a nano-reinforcing material, a polymer matrix, and an epoxy-functionalized graft polymer compatible with the polymer matrix.

There is also provided a process for preparing a nanocomposite, the process comprising dispersing a nano-reinforcing material in a polymer matrix in the presence of an epoxy-functionalized graft polymer compatible with the polymer matrix.

There is also provided a process for producing a nanocomposite comprising: selecting a polymer matrix; selecting a nano-reinforcing material; selecting an epoxy-functionalized graft polymer having a matrix compatible portion selected to be compatible with the polymer matrix and having an epoxy-functionalized portion selected to be capable of interacting with surface and/or modified groups of the nano-reinforcing material; and, preparing the nanocomposite.

The nanocomposite comprises a layered nano-reinforcing material uniformly distributed within a polymer matrix due to the presence of an epoxy-functionalized graft polymer, which is compatible with the polymer matrix. Particularly when the hydrophilic and hydrophobic properties of the nano-reinforcing material and the polymer matrix, respectively, prevent the two components from normally forming a homogeneous mixture, the epoxy-functionalized graft polymer is capable of promoting uniform distribution of the nano-reinforcing material within the polymer matrix because of its dichotomous characteristics.

Without being held to any theory of action, the epoxy-functionalized graft polymer is thought to improve the intercalation/exfoliation of the nano-reinforcing material at a nanoscale level within the polymer matrix by promoting favorable interactions between the two components of the nanocomposite across the interface. It is thought that the epoxy-functionalized graft polymer acts as an intercalating agent and/or an exfoliating agent by interacting with surface and/or modified groups of the nano-reinforcing material to facilitate distribution of the nano-reinforcing material in the polymer matrix. As an intercalating agent, the epoxy-functionalized graft polymer is thought to increase the gallery space between individual layers of the nano-reinforcing material. As an exfoliating agent, the epoxy-functionalized graft polymer is thought to increase the inter-layer spacing between sheets to such a large extent that the sheets lose orientation with respect to each other, or, the inter-sheet distances become random even if sheet orientation is locally maintained. Also, since the epoxy-functionalized graft polymer is designed to be compatible with the polymer matrix, homogeneous distribution of the nano-reinforcing material in the polymer matrix is enhanced.

Thus, there is also provided a process for controlling the performance characteristics of a nanocomposite by controlling the chemistry of an epoxy-functionalized graft polymer depending upon the surface and/or modified groups of a selected nano-reinforcing material, and, depending on the type of polymer matrix selected.

The epoxy-functionalized graft polymer can be prepared by melt compounding processes either separately or at the same time as the nanocomposite. Thus, owing to the highly specific chemical reactivity of the epoxy-functionalized graft polymer, the nanocomposite can readily be prepared by the melt exfoliation method using standard compounding equipment. Depending on the reactivity difference between the components of the nanocomposite, different feeding methods, temperatures and screw profiles may have to be used. Moreover, the preparation of the nanocomposites of the present invention does not require any complex equipment, as intercalation and exfoliation can occur during a standard mixing/compounding operation.

The polymer nanocomposites of the present invention exhibit an excellent balance of properties such as improved rigidity and tensile and flexural strength without or with only a modest loss of ductility and toughness, improved heat or chemical resistance, ignition resistance, superior resistance to diffusion of polar liquids and gases, higher yield strength in the presence of polar solvents such as water, methanol, or ethanol, or enhanced stiffness and dimensional stability compared to nanocomposites of the prior art.

According to the present invention, there are also provided products fabricated from nanocomposite compositions comprising a nano-reinforcing material uniformly distributed within a polymer matrix in the presence of an epoxy-functionalized graft polymer. The polymer composites of the present invention are useful as barrier films, barrier foams, or other molded or extruded thermoplastic articles using any conventional thermoplastic fabrication methods. The articles can be used in a wide variety of applications including transportation parts (for example, automotive and aerospace parts), electronics, business equipment such as computer housings, building and construction materials, and packaging material.

BRIEF DESCRIPTION OF THE DRAWINGS

In order that the invention may be more clearly understood, preferred embodiments thereof will now be described in detail by way of example, with reference to the accompanying drawings, in which.

DESCRIPTION OF PREFERRED EMBODIMENTS

Figure 1:
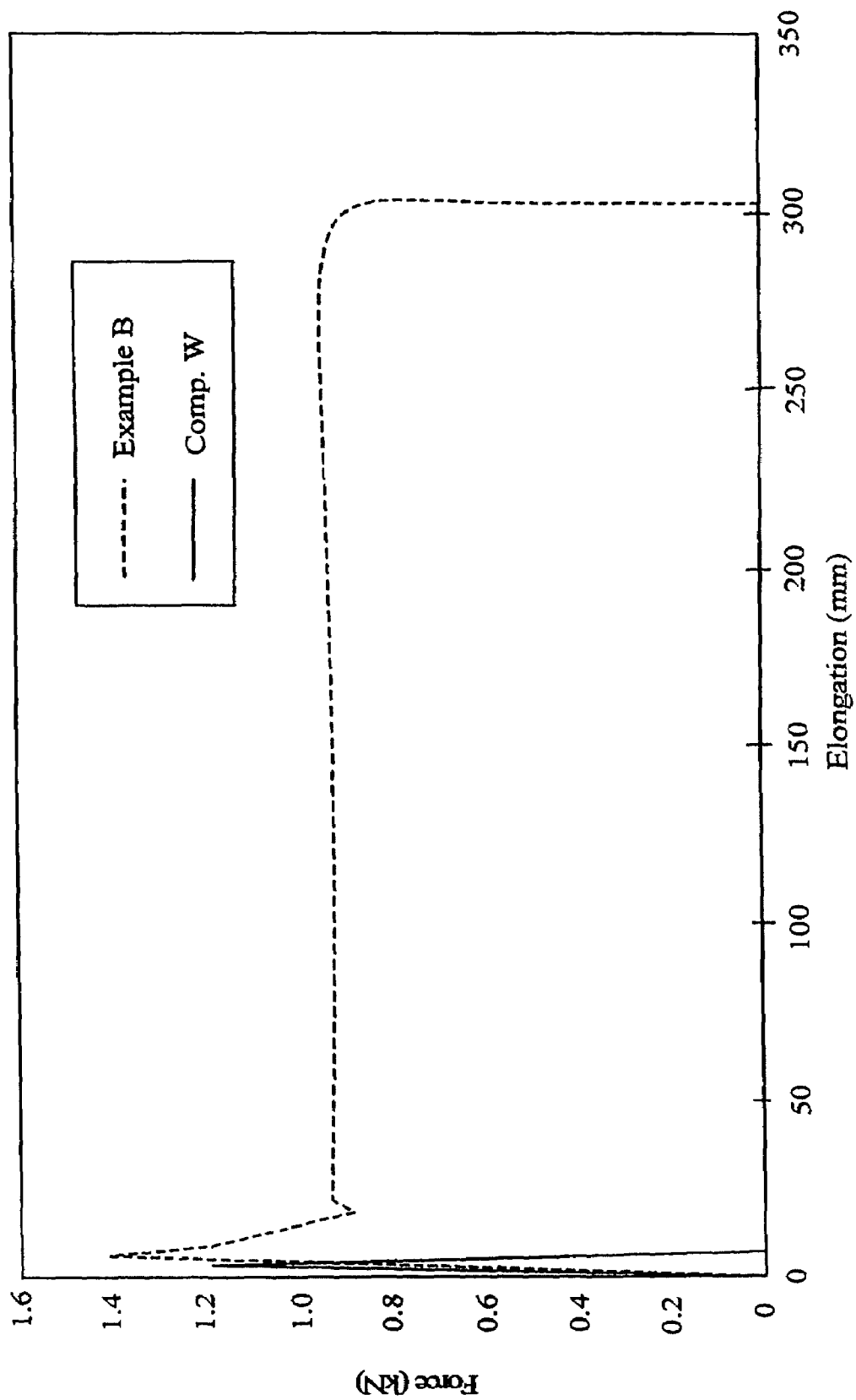
FIG. 1 is a graph of elongation (mm) vs. applied force (kN) comparing elongation of a nanocomposite of the present invention with that of a nanocomposite of the prior art.

As used in the specification and the appended claims, the singular forms "a," "an" and "the" include plural referents unless the context clearly dictates otherwise. For example, reference to an "article", "container" or "bottle" fabricated from the nanocomposite of this invention is intended to include the processing of a plurality of articles, containers or bottles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Nano-reinforcing Material:

A nano-reinforcing material is any reinforcing material or mixture thereof, which has at least one dimension in the nanometer scale. Suitable nano-reinforcing materials include, for example, layered crystalline clays (such as natural or synthetic silicates like aluminium or aluminium-magnesium silicates), nano-fibers (such as cellulosic nano-fibers), nano-whiskers (such as cellulosic nano-whiskers), carbon nanotubes, metal-oxide nanotubes, metallic oxides, metallic sulfides, metallic layered double hydroxides, or mixtures thereof.

Nano-reinforcing materials may be treated with organophilic modifying compounds to enhance physical and chemical interaction between the nano-reinforcing material and the epoxy group of the epoxy-functionalized graft polymer. Organophilic modifying compounds are generally known in the art and include such interacting groups as, for example, amines, carboxylics, alcohols, phenols, silanes, organophilic ions, onium ions (ammonium, phosphonium, sulfonium and the like), etc.

The nano-reinforcing material may be present in the nanocomposite in an amount that is suitable for imparting the reinforcing effects without compromising other properties of the composite necessary for the application in which the nanocomposite is to be used. If the amount of nano-reinforcing material is too low then a sufficient reinforcing effect will not be obtained, while too much nano-reinforcing material may hinder exfoliation, compromise the moldability of the nanocomposite and reduce its performance parameters. One skilled in the art can readily determine a suitable amount by experimentation. The amount of nano-reinforcing material in the nanocomposite may be from about 0.1 to about 40 weight percent based on the total weight of the nanocomposite, or from about 0.2 to about 30 weight percent, or from about 0.5 to about 20 weight percent, or from about 1 to about 10 weight percent.

Layered clays may be mineral or synthetic layered silicates. Phyllosilicates (smectites) are particularly suitable. Typical layered clays include, for example, bentonite, kaolinite, dickite, nacrite, stapulgite, illite, halloysite, montmorillonite, hectorite, fluorohectorite, nontronite, beidellite, saponite, volkonskoite, magadiite, medmontite, kenyaite, sauconite, muscovite, vermiculite, mica, hydromica, phegite, brammalite, celadonite, etc., or a mixture thereof.

Layered clay is a hydrated aluminum or aluminum-magnesium silicate comprised of multiple platelets. The clay may comprise surface groups (e.g., hydroxyl or ionic groups), which render the surface more hydrophilic thereby enhancing the physical and chemical interactions of the clay with the epoxy groups of the epoxy-functionalized graft polymer. Layered clays may be treated with inorganic or organic bases or acids or ions or be modified with an organophilic intercalant (e.g., silanes, titanates, zirconates, carboxylics, alcohols, phenols, amines, onium ions) to enhance the physical and chemical interactions of the clay with the epoxy groups of the epoxy-functionalized graft polymer. When the epoxy-functionalized graft polymer interacts with a layered clay, either the gallery space between the individual layers of a well-ordered multilayer clay is increased and/or the clay aggregates are broken down into smaller stacks due to the strong interface interaction that occurs between the clay surface/modified groups and the epoxy groups of the epoxy-functionalized graft polymer.

Organophilic onium ions are organic cations (e.g., $N^+$, $P^+$, $O^+$, $S^+$) which are capable of ion-exchanging with inorganic cations (e.g., $Li^+$, $Na^+$, $K^+$, $Ca^{2+}$, $Mg^{2+}$) in the gallery space between platelets of the layered material. The onium ions are sorbed between platelets of the layered material and ion-exchanged at protonated $N^+$, $P^+$, $O^+$, $S^+$ ions with inorganic cations on the platelet surfaces to form an intercalate. Examples of some suitable organophilic onium ions are alkyl ammonium ions (e.g., hexylammonium, octylammonium, 2-ethylhexammonium, dodecylammonium, laurylammonium, octadecylammonium, trioctylammonium, bis(2-hydroxyethyl)octadecyl methyl ammonium, dioctyldimethylammonium, distearyldimethylammonium, stearyltrimethylammonium, ammonium laurate, etc.), and alkyl phosphonium ions (e.g., octadecyltriphenyl phosphonium). Preferably, layered clay may be modified with an onium ion in an amount of about 0.3 to about 3 equivalents of the ion exchange capacity of the clay, more preferably in an amount of about 0.5 to about 2 equivalents.

Polymer Matrix:

The polymer matrix may comprise any polymeric material suitable for the particular application for which the nanocomposite is intended. Polymer matrices may be classified in a number of different ways. A suitable polymer matrix may comprise a homopolymer, a copolymer, a terpolymer, or a mixture thereof. The polymer matrix may comprise amorphous or crystalline polymers. The polymer matrix may comprise hydrophobic or hydrophilic polymers. The polymer matrix may comprise linear, branched, star, cross-linked or dendritic polymers or mixtures thereof. Polymer matrices may also be conveniently classified as thermoplastic, thermoset and/or elastomeric polymers. It is clear to one skilled in the art that a given polymer matrix may be classifiable into more than one of the foregoing categories.

Thermoplastic polymers generally possess significant elasticity at room temperature and become viscous liquid-like materials at a higher temperature, this change being reversible. Some thermoplastic polymers have molecular structures that make it impossible for the polymer to crystallize while other thermoplastic polymers are capable of becoming crystalline or, rather, semi-crystalline. The former are amorphous thermoplastics while the latter are crystalline thermoplastics. Some suitable thermoplastic polymers include, for example, olefinics (i.e., polyolefins), vinylics, styrenics, acrylonitrilics, acrylics, cellulosics, polyamides, thermoplastic polyesters, thermoplastic polycarbonates, polysulfones, polyimides, polyether/oxides, polyketones, fluoropolymers, copolymers thereof, or mixtures thereof.

Some suitable olefinics (i.e., polyolefins) include, for example, polyethylenes (e.g., LDPE, HDPE, LLDPE, UHMWPE, XLPE, copolymers of ethylene with another monomer (e.g., ethylene-propylene copolymer)), polypropylene, polybutylene, polymethylpentene, or mixtures thereof. Some suitable vinylics include, for example, polyvinylchloride, chlorinated polyvinylchloride, vinyl chloride-based copolymers, polyvinylidenechloride, polyvinylacetate, polyvinylalcohol, polyvinyl aldehydics (e.g., polyvinylacetal), polyvinylalkylethers, polyvinylpyrrolidone, polyvinylcarbazole, polyvinylpyridine, or mixtures thereof. Some suitable styrenics include, for example, polystyrene, polyparamethylstyrene, polyalphamethylstyrene, high impact polystyrene, styrene-based copolymers, or mixtures thereof. Some suitable acrylonitrilics include, for example, polyacrylonitrile, polymethylacrylonitrile, acrylonitrle-based copolymers, or mixtures thereof. Some suitable acrylics include, for example, polyacrylicacid, polymethacrylicacid, polymethacrylate, polyethylacrylate, polybutylacrylate, polymethylmethacrylate, polyethylmethacrylate, cyanoacrylate resins, hydroxymethylmethacrylate, polacrylamide, or mixtures thereof. Some suitable cellulosics include, for example, cellulose, cellulose esters, cellulose acetates, mixed cellulosic organic esters, cellulose ethers, methylcellulose, ethylcellulose, carboxymethylcellulose, hydroxyethylcellulose, or mixtures thereof. Some suitable polyamides include, for example, aliphatic polyamides (i.e., nylons), aromatic polyamides, transparent polyamides, or mixtures thereof. Some suitable thermoplastic polyesters/polycarbonates are, for example, polyalkylene terephthalates (e.g., polyethylene terephthalate, polybutylene terephthalate), polycyclohexanedimethanol terephthalates, polyarylesters (e.g., polyarylates), polycarbonate, or mixtures thereof. Some suitable polysulfones include, for example, diphenylsulfone, polybisphenolsulfone, polyethersulfone, polyphenylethersulfones, or mixtures thereof. Some suitable polyimides include, for example, polyamideimide, polyetherimide, or mixtures thereof. Some suitable polyether/oxides include, for example, polymethyleneoxides, polyethyleneoxide, polypropyleneoxide, polyphenyleneoxides, or mixtures thereof. Some suitable polyketones include, for example, polyetheretherketone-1. Some suitable fluoropolymers include, for example, polytetrafluoroethylene, polychlorotrifluoroethylene, polyvinylfluoride, polyvinylidenefluoride, polyperfluoroalkoxy, polyhexafluoropropylene, polyhexafluoroisobutylene, fluoroplastic copolymers, or mixtures thereof.

Thermoset polymers (thermoset resins) generally arise from a complex combination of polymerization and cross-linking reactions, which convert low- or relatively low-molecular weight molecules into three-dimensional networks. The reaction is irreversible and the resulting polymeric species is generally hard. The polymerization and cross-linking reactions may be temperature-activated, catalyst-activated or mixing-activated. Some suitable thermosets include, for example, formaldehyde systems, furan systems, allyl systems, alkyd systems, unsaturated polyester systems, vinylester systems, epoxy systems, urethane/urea systems, or mixtures thereof.

Some suitable formaldehyde systems include, for example, urea-formaldehyde resins, melamine-formaldehyde resins, phenol-formaldehyde resins, or mixtures thereof. Some suitable furan systems include, for example, furan resins, furfural resins, furfuryl alcohol resins, or mixtures thereof. Some suitable allyl systems include, for example, diallyl phthalate, diallyl isophthalate, diethyleneglycol bis(allyl carbonate), or mixtures thereof. Some suitable alkyd systems include, for example, the reaction product of ethylene glycol, glycerol and phthalic acid with fatty acids. Some suitable unsaturated polyester systems include, for example, one component which is a polyester product of a reaction between a difunctional acid or anhydride (e.g., maleic acid, maleic anhydride, phthalic anhydride, terephthalic acid) with a difunctional alcohol (e.g., ethylene glycol, propylene glycol, glycerol), and, a second component which is a monomer capable of polymerizing and reacting with unsaturations in the polyester component (e.g., styrene, alphamethylstyrene, methylmethacrylate, diallylphthalate). Some suitable vinylester systems include, for example, the reaction of diglycidyl ether of bisphenol A with methacrylic acid. Some suitable epoxy systems include, for example, the reaction between epichlorohydrin and a multifunctional acid, amine or alcohol. Some suitable urethane/urea systems include, for example, the reaction product of a liquid isocyanate (e.g., 2,4-toluenediisocyanate, 2,6-toluenediisocyanate) and a polyol (e.g., polyethylene ether glycol, polypropylene ether glycol).

Elastomeric polymers (elastomers) can generally be defined as materials capable of large elastic deformations and are often referred to as rubbers. Elastomers may be classified as vulcanizable elastomers, reactive system elastomers and thermoplastic elastomers. Some suitable elastomers include, for example, polyisoprene, polybutadiene, polychloroprene, polyisobutylene, styrene-butadiene rubber, acrylonitrile-butadiene rubber, ethylene-propylene rubber, ethylene-propylene-diene rubber, chlorinated polyethylene, chlorosulfonated polyethylene, ethylene-vinylacetate copolymer, ethylene-acrylate copolymer, fluoroelastomers (e.g., polyvinylidene fluoride, polychlorotrifluoroethylene), silicone polymers (e.g., polydimethylsiloxane), acrylic rubber, epichlorohydrin rubber, polysulfide rubbers, propyleneoxide rubbers, polynorbornene, polyorganophosphazenes, olefinic thermoplastic rubbers, styrenic thermoplastic rubbers, urethane thermoplastic rubbers, etherester thermoplastic rubbers, etheramide thermoplastic rubbers, copolymers of an elastomer, or mixtures thereof.

Preferred polymer matrices are typically those that may be processed above their glass transition temperature or above their melting point with traditional extruding, molding and pressing equipment. Thus, preferred are thermoplastic polymers (including homopolymers, copolymers, etc.), elastomers, or mixtures thereof.

Polymer matrices may also be classified as amorphous or crystalline. This is an important consideration when determining the nature of the epoxy-functionalized graft polymer, which needs to be selected. To promote homogeneous dispersion of a nano-reinforcing material into the polymer matrix, in the mixing step the epoxy-functionalized graft polymer needs to be miscible with molten polymer matrix. During consolidation, morphological compatibility plays an important role. Thus, if the polymer matrix comprises an amorphous polymer, choosing an epoxy-functionalized graft polymer that has a matrix miscible portion that is also amorphous will promote interaction between the graft polymer and the polymer matrix, thereby maintaining the dispersion quality of the nano-reinforcing material into the polymer matrix that was achieved in the mixing step of the molten system. If the polymer matrix is crystalline, choosing an epoxy-functionalized graft polymer that has a matrix compatible portion that is also crystalline may permit co-crystallization of the epoxy-functionalized graft polymer with the polymer matrix. At the same time the non-crystalline parts of these two polymers should form a single phase, thereby maintaining the dispersion quality of the nano-reinforcing material into the polymer matrix. However, the primary importance of morphological compatibility is to ensure a good interface interaction between the epoxy-functionalized graft polymer and the polymer matrix.

In amorphous polymer matrices, polymer chain ordering is essentially random, although small amounts of crystallinity may be present in an amorphous polymer matrix (e.g., as in polyvinylchloride).

An common amorphous polymer should not show a melting on crystallization peak on a second DSC scan at a rate of 20° C./minute. Amorphous polymers are generally characterized by a high degree of transparency and a lack of a sharply defined melting point ($T_M$).

Some amorphous polymers include, for example, poly(1-butene), poly(2-butene), copolymers of 1-butene and 2-butene, polystyrene, polymethylmethacrylate, polycarbonate of bisphenol-A, polyvinylchloride, acrylonitrile-butadiene-styrene copolymer, styrene-acrylonitrile copolymer, modified poly(2,6-dimethyl 1,4-phenylene ether) and many others.

Crystalline polymers exhibit a higher degree of three-dimensional order in the solid state, resulting from their molecular structure. The degree of this ordering depends both on the molecular structure (the chain configuration) and on the processing method and parameters (e.g., rate of cooling, deformation prior to or during crystallization). Few bulk polymers have a high degree of crystallinity, with most crystalline polymers being more properly characterized as semi-crystalline. Crystalline polymers are normally non-transparent although they may be made translucent by controlling the crystallization process.

Some crystalline polymers include, for example, polypropylene, polyethylene (e.g., low density polyethylene), polyoxymethylene, polyamide (i.e., nylon), polyethyleneterephthalate, polybutyleneterephthalate, polyphenylene sulfide, etc.

A polymer matrix may also be classified as hydrophobic or hydrophilic. Hydrophilic polymers exhibit a significant degree of interaction with water, humidity or polar solvents and may have some solubility or dispersability in aqueous media. Thus, to a certain degree they may be able to interact with hydrophilic surface groups on the nano-reinforcing material, particularly the layered clays. Hydrophobic polymers are normally insoluble (or not dispersable) in water and have no or very poor interaction with water, humidity or polar solvents. Thus, hydrophobic polymers do not interact well with hydrophilic surface groups on the nano-reinforcing material. Selection of a suitable epoxy-functionalized graft polymer also depends to a certain degree on whether the matrix polymer is hydrophobic or hydrophilic. If the polymer matrix is hydrophobic, choosing an epoxy-functionalized graft polymer that has a hydrophobic matrix compatible portion (particularly a thermodynamically compatible portion) will promote interaction of the epoxy-functionalized graft polymer with the polymer matrix thereby promoting interface interaction between the nano-reinforcing material and the polymer matrix. Likewise, matching a hydrophilic polymer matrix to a hydrophilic matrix compatible portion (particularly a thermodynamically compatible portion) of the epoxy-functionalized graft polymer promotes interface interaction between the nano-reinforcing material and the hydrophilic polymer matrix. One example of a hydrophilic polymer is a polyacrylic acid while an example of a hydrophobic polymer is polypropylene. One skilled in the art will readily recognize hydrophilic and hydrophobic polymers.

The number average molecular weight of the polymer matrix may vary considerably depending on the specific type of polymer and the use to which the nanocomposite is to be put. Preferably, the number average molecular weight is greater than about 500. Polymer matrices having a number average molecular weight of from about 1,300 to about 15,000,000 are suitable for a number of applications. In one embodiment, the number average molecular weight may be from about 1,500 to about 2,000,000. In another embodiment, the number average molecular weight may be from about 1,500 to about 300,000.

The amount of polymer matrix present in the nanocomposite will depend on the particular use to which the nanocomposite is put and the particular polymer matrix. The polymer matrix may be present in an amount from about 0.1 to about 99.9 weight percent based on the total weight of the nanocomposite, or from about 20 to about 99.0 weight percent, or from about 40 to about 98.0 weight percent.

Epoxy-functionalized Graft Polymer:

The epoxy-functionalized graft polymer preferably has a matrix compatible portion and an epoxy-functionalized portion. The matrix compatible portion is preferably a polymer having characteristics compatible with those of the polymer matrix. Throughout the specification of the present invention, the term "compatible", and related phrases, refer to interactions in the crystalline or liquid state. The term "miscible", and related phrases, refers primarily to interactions in the liquid or glassy state (e.g., melts, glasses or solutions). The matrix compatible portion is chosen primarily for its compatibility with the polymer matrix, but it is also useful to select a matrix compatible portion that is also miscible with the polymer matrix since good miscibility will promote efficient dispersion of the epoxy-functionalized graft polymer in the polymer matrix during melt compounding and facilitates the intercalation/exfoliation of the nanoreinforcement in the polymer matrix as well since the polymer molecules follow the epoxy-functionalized graft polymer to enter the clay galleries.

The characteristics of the matrix compatible portion considered in determining compatibility with the polymer matrix may be based on physical properties (e.g., crystallinity (crystalline or amorphous), hydrophobicity (hydrophobic or hydrophilic)), on chemical properties (e.g., reactivity between functional groups), on chemical structure, or on a combination thereof. Other specific examples of such characteristics may be one or more of similar cohesive energy densities, similar or complementary capacities for dispersive interactions, similar or complementary capacities for polar interactions, similar or complementary capacities for hydrogen bonding interactions, other specific interactions (e.g., acid/base interactions, including Lewis acid/Lewis base interactions), etc. Some of these characteristics (e.g. hydrophobicity) may also be considered in determining miscibility of the matrix compatible portion in the polymer matrix during melt compounding.

The matrix compatible portion may or may not comprise the same polymeric species as the polymer matrix itself. However, it is evident that, in many cases, the greatest compatibility of the epoxy-functionalized graft polymer with the polymer matrix arises when the matrix compatible portion comprises the same polymeric species as the polymer matrix itself. In fact, particularly for thermoplastic- and/or elastomer-based nanocomposites, the epoxy-functionalized graft polymer itself may also be the polymer matrix, i.e., it could be considered that each molecule of the polymer matrix has an epoxy-functionalized portion grafted on to it.

As has been previously mentioned, the matrix compatible portion is selected for its compatibility with the polymer matrix. The matrix compatible portion of epoxy-functionalized graft polymer may comprise any of the polymeric species previously described in the section on polymer matrices. Preferably, the matrix compatible portion comprises a thermoplastic polymer, an elastomer, a thermoset or a mixture thereof.

The epoxy-functionalized portion is selected to be able to interact with surface and/or modified groups of the nano-reinforcing material. The epoxy-functionalized portion may comprise one or more epoxy groups. Preferably, there is an epoxy group located at or near the end of the epoxy-functionalized portion, to optimize interaction of the epoxy group with the nano-reinforcing material. Additional epoxy groups may also be present in the epoxy-functionalized portion. Furthermore, more than one epoxy-functionalized portion may be present on the matrix compatible portion resulting in a graft polymer having multiple epoxy groups located along the length of the graft polymer. If the epoxy-functionalized portion also has multiple epoxy groups, there will be a large number of epoxy groups available for interaction with the nano-reinforcing material. It is often desirable to have more than one epoxy-functionalized portion present on the matrix compatible portion at or near opposite ends of the matrix compatible portion. However, it is also desirable to control the overall number of epoxy groups in the final nanocomposite material to ensure that there is enough epoxy to promote sufficient interaction of the epoxy-functionalized graft polymer with the nano-reinforcing material without having too much epoxy, which may impact negatively on miscibility and/or compatibility of the epoxy-functionalized graft polymer with the polymer matrix and hence on nanocomposite properties. Preferably, epoxy groups may be present in the nanocomposite in an amount of from about 0.01 to about 800 mole percent (mol %) based on the total moles of macromolecules in the nanocomposite. Epoxy groups may be present in the nanocomposite in an amount of from about 0.1 to about 200 mol %, or from about 1 to about 10 mol %.

The epoxy-functionalized graft polymer may be commercially available or may be synthesized depending on what is available and on what combination of polymer matrix and nano-reinforcing material is desired in the nanocomposite.

The number average molecular weight of the epoxy-functionalized graft polymer may vary considerably depending on the specific use to which the nanocomposite is to be put and the specific polymer matrix in the nanocomposite. Preferably, the number average molecular weight is greater than about 250. Epoxy-functionalized graft polymers having a number average molecular weight of from about 1,300 to about 15,000,000 are suitable for a number of applications. In one embodiment, the number average molecular weight may be from about 1,500 to about 2,000,000. In another embodiment, the number average molecular weight may be from about 1,500 to about 200,000. In addition, the epoxy-functionalized graft polymer generally has a longer main chain than any graft-generated chain present on the graft polymer.

In synthesizing an epoxy-functionalized graft polymer, the epoxy-functionalized portion may be introduced by grafting an epoxy-functionalized molecule on to the matrix compatible portion, either by directly grafting an epoxy-functionalized molecule on to the matrix compatible portion, or, by first grafting a coupling agent on to the matrix compatible portion and then attaching an epoxy-functionalized molecule to the coupling agent. Alternatively, an epoxy-functionalized molecule may be grafted on to a monomer and the monomer then polymerized or copolymerized to form an epoxy-functionalized graft polymer. In all cases, the result is an epoxy-functionalized graft polymer.

It should be noted that the terms "epoxy-functionalized graft polymer", "epoxy-functionalized portion" and "epoxy-functionalized molecule" have different meanings in the context of this invention. An "epoxy-functionalized graft polymer" refers to an entity comprising a matrix compatible portion and an epoxy-functionalized portion. Therefore, "epoxy-functionalized portion" refers to that portion of the epoxy-functionalized graft polymer that bears an epoxy group or groups. "Epoxy-functionalized molecule" refers to the epoxy bearing precursor molecule that is used to form the epoxy-functionalized portion of the epoxy-functionalized graft polymer.

In one embodiment, the epoxy-functionalized graft polymer may be simply an epoxidized polymer in which an epoxy group has been directly grafted on to a polymer. Thus, the epoxy-functionalized portion of the graft polymer is simply an epoxy group. Some suitable examples include epoxidized styrene-butadiene-styrene block copolymer, epoxidized styrene-butadiene copolymer, epoxidized methyl (meth)acrylate-butadiene copolymer, epoxidized polybutadiene, epoxidized polyisoprene, partially hydrogenated polymers thereof, etc.

In other embodiments, there is a wide variety of epoxy-functionalized molecules suitable for grafting on to the matrix compatible portion. Epoxy-functionalized molecules may be small-molecules, oligomers or polymers. In addition to bearing an epoxy group, the epoxy-functionalized molecule should comprise a functional group that is capable of being grafted directly onto the matrix compatible portion's backbone, or, which is capable of being grafted onto a functional group pendant from the matrix compatible portion, or, which is capable of reacting with a coupling agent that has been grafted onto the matrix compatible portion. For example, an epoxy-functionalized molecule comprising an olefinic bond can be directly grafted to a polyolefin. In another example, an epoxy-functionalized molecule comprising more than one epoxy group can be directly grafted onto a polyamide through the N—H of the polyamide. In a third example, an epoxy-functionalized molecule can be grafted onto the matrix compatible portion through a functional group pendant from a side chain, inter chain or end chain of the matrix compatible portion, such as in the reaction of an epoxy-functionalized molecule comprising more than one epoxy group with an end chain acid group of polyethylene terephthalate. In a fourth example, an epoxy-functionalized molecule comprising more than one epoxy group cannot be grafted directly to a polyolefin so a coupling agent like maleic anhydride or acrylic acid may be grafted first onto the polyolefin through the olefinic bond of the maleic anhydride or acrylic acid and the epoxy-functionalized molecule is then attached to the maleic anhydride or acrylic acid by a reaction between the anhydride part of the maleic anhydride or the carboxyl group of the acrylic acid and one of the epoxy groups of the epoxy-functionalized molecule.

Thus, epoxy modified-coupling agent-grafted polymers or copolymers may serve as the epoxy-functionalized graft polymer. Examples include, but are not limited to an epoxy-modified-maleic anhydride-grafted polypropylene or an epoxy-modified-acrylic acid-grafted polypropylene, wherein the epoxy may be an epoxy resin, a multi-glycidyl ether of bis-phenol A, or the like, for example.

When a coupling agent is required because the desired epoxy-functionalized molecule cannot be directly grafted to the desired matrix compatible portion, there are a variety of choices known to one skilled in the art. Examples of coupling agents include, but are not limited to, maleic anhydride, styrene-maleic anhydride, acrylic acid, amine, alcohol, etc. The coupling agent is generally grafted on to the matrix compatible portion followed by attachment of the epoxy-functionalized molecule to the coupling agent. The combination of the coupling agent and the epoxy-functionalized molecule can be viewed as the epoxy-functionalized portion of the epoxy-functionalized graft polymer.

In addition, there is a number of commercially available compounds in which a coupling agent has already been grafted on to a matrix compatible portion (e.g., maleic anhydride grafted polyolefins like Epolene™ E-43, G-3015, G-3003, C-16, C-18, G-XX01, G-XX15 from Eastman, and Polybond™ 3002, 3009, 3150 from UniRoyal Chemicals; and, acrylic acid grafted polyolefins like Polybond™ 1001, 1009 from UniRoyal Chemicals). Such commercially available compounds may be directly reacted with an appropriate epoxy-functionalized molecule to form an epoxy-functionalized graft polymer.

It is evident from the foregoing discussion that designing the epoxy-functionalized graft polymer requires matching the matrix compatible portion to the epoxy-functionalized molecule in terms of the ability to graft the epoxy-functionalized molecule to the matrix compatible portion, either directly onto the backbone of the matrix compatible portion or through a functional group pendant from the matrix compatible portion. It is well within the ability of one skilled in the art to be able to make appropriate matches. Tables 1 and 2 provide exemplary lists to serve as guides. One skilled in the art will readily recognize other possible combinations.

In addition, when a coupling agent is needed because the desired epoxy-functionalized molecule cannot be grafted onto the desired matrix compatible portion, one functional group on the coupling agent must permit grafting onto the matrix compatible portion while another functional group on the coupling agent must be able to react with a functional group on the epoxy-functionalized molecule. In both cases, selection of appropriate functional groups is well within the ability of one skilled in the art. Reference is made to Table 1 for an exemplary list for matching functional group to polymer for the purpose of grafting the coupling agent onto the matrix compatible portion. Reference is made to Table 2 for an exemplary list of functional group pairs (functional group 1 being involved in a coupling reaction and functional group 2 reacting with the epoxy-functionalized molecule) that would facilitate attaching an epoxy-functionalized molecule to a coupling agent. One skilled in the art will readily recognize other possible combinations.

TABLE 1

| Matrix compatible portion | Functional group on epoxy-functionalized molecule |
| --- | --- |
| Polyolefins - homopolymers and copolymers | Olefinic bond |
| Polyolefins and their copolymers grafted with maleic anhydride, acrylic acid, etc | Epoxide |
| Polyamide | Epoxide |

TABLE 1-continued

| Matrix compatible portion | Functional group on epoxy-functionalized molecule |
| --- | --- |
| Thermoplastic polyester | Epoxide |
| Vulcanizable elastomers | Olefinic bond |
| Thermoplastic elastomers | Olefinic bond |
| Elastomers with such reactive groups as: alcohol, anhydride, acid, amine, cyanate, etc. | Epoxide |

TABLE 2

| Functional Group 1 | Functional Group 2 |
| --- | --- |
| Vinyl | Hydride |
| Vinyl | Alcohol |
| Vinyl | Alkyl halide |
| Phenol | Alkyl halide |
| Isocyanate, Isothiocyanate | Alcohol (hydroxyl) |
| Acid chloride | Phenol |
| Acid chloride | Alcohol (hydroxyl) |
| Acid chloride | Amide |
| Anhydride | Epoxy |
| Carboxylic acid | Alcohol (hydroxyl) |
| Ester | Alcohol (hydroxyl) |
| Carboxylic acid | Epoxy |
| Amide | Acid chloride |
| Alcohol (hydroxyl) | Vinyl |
| Alcohol (hydroxyl) | Acid chloride |
| Alcohol (hydroxyl) | Ester |
| Alcohol (hydroxyl) | Carboxylic acid |
| Amine | Anhydride |
| Amine | Acid chloride |
| Amine | Epoxide |
| Amine | Carboxylic acid |

In yet another embodiment, the epoxy-functionalized graft polymer may be further epoxidized by transforming functional groups pendant from side chains, inter chains and/or end chains into epoxy groups. Such further epoxidation may be done fully or partially and will ultimately result in nanocomposites having an even greater amount of epoxy per mole of epoxy-functionalized graft polymer.

Epoxy-functionalized molecules comprising one or more glycidyl groups are of particular interest. Examples include glycidyl methacrylate, glycidyl acrylate, glycidyl-2-ethyl acrylate, glycidyl-2-propyl acrylate, monoglycidyl itaconate, monoglycidyl butenetricarboxylate, diglycidyl butenetricarboxylate, glycidyl ester of maleic acid, glycidyl ester of crotonic acid, glycidyl ester of fumaric acid, alpha-chloroallyl glycidyl ester, diglycidyl ether of bis-phenol A, diglycidyl ether of p-aminophenol, N,N,N',N'-tetraglycidyl-4,4'-methylene-bis-benzene amine, 4-glycidyloxy-N,N'-diglycidylaniline, tetraglycidyl diamino diphenyl methane, diglycidyl ether of bis-phenol A novolac resin, epoxy phenol novolacs, epoxy cresol novolacs, allyl glycidyl ether, methallyl glycidyl ether, isopropenylphenyl-glycidyl ether, vinyl glycidyl ether, glycidyl oxyethylvinyl ether, styrene-p-glycidyl ether, p-glycidyl styrene, epichlorohydrin, polynuclear phenolepoxy, hydantoin epoxy, etc. Polymeric species based on the polymerization of one or more glycidyl monomers may also be used as an epoxy-functionalized molecule.

Grafting of an epoxy-functionalized molecule or a coupling agent onto a matrix compatible portion is often accomplished by using a free radical initiator or some form of activating energy (e.g., actinic radiation, heat, etc.). Free radical initiators are well known and one skilled in the art can readily select an appropriate initiator for the particular grafting reaction desired. Dialkyl peroxides, such as 1,1-bis (t-butylperoxy)-3,3,5-trimethyl cyclohexane or 2,5-dimethyl-2,5-(di-ter-butylperoxy)-hexane are examples of one class of suitable free radical initiators. Free radical initiators are preferably used in an amount of from about 0.1 to about 3.0 parts by weight, more preferably from about 0.5 to about 2.0 parts by weight, based on 100 parts by weight of matrix compatible portion.

In addition, the grafting process is usually performed at a temperature above the melt temperature of the matrix compatible portion in a mixer, such as, for example, an extruder, an internal mixer or a sigma blade mixer. However, when an epoxy-functionalized molecule is being grafted directly to a matrix compatible portion, it is usually desirable to do the grafting at a temperature below about 240° C., preferably below about 225° C. This would minimize unwanted reactions of epoxy groups, like ring opening, self-etherification, oxidation, homopolymerization, etc. The amount of epoxy-functionalized molecule (or a coupling agent) in the grafting process is preferably from about 0.1 to about 10 parts by weight, more preferably from about 0.3 to about 5 parts by weight, for 100 parts by weight of matrix compatible portion.

Generally, during a grafting process, the free radical initiator may be: mixed with a matrix compatible portion before the addition of epoxy-functionalized molecule or coupling agent; mixed with an epoxy-functionalized molecule or a coupling agent before the epoxy-functionalized molecule or the coupling agent is combined with a matrix compatible portion; or mixed with a melt of a matrix compatible portion and an epoxy-functionalized molecule or a coupling agent. When an epoxy-functionalized molecule is used, the temperature is preferably brought to the desired temperature range rapidly to minimize epoxy ring opening. In this case, it is therefore more preferred that the free radical initiator be injected into a melt of a matrix compatible portion and an epoxy-functionalized molecule with the melt being at or near the desired grafting temperature.

Contacting the components of the graft reaction is preferably done for a time period sufficient to graft from about 10 percent to about 90 percent of the epoxy-functionalized molecule or the coupling agent to the matrix compatible portion. In an extruder, for example, a residence time of about one to about ten seconds is generally sufficient for the grafting of epoxy-functionalized molecule onto the matrix compatible portion, but this greatly depends on the amount and type of free radical initiator present. The grafting may result in about 60 to about 100 percent retention of unopened epoxy groups in the epoxy-functionalized portion of the epoxy-functionalized graft polymer. To minimize degradation of the matrix compatible portion and extend the length of the epoxy-functionalized portion at the same time, a co-monomer like styrene, methylmethacrylate, or the like, may be additionally used.

The amount of epoxy-functionalized graft polymer in the nanocomposite should be sufficient to promote interaction of the nano-reinforcing material with the polymer matrix. The epoxy-functionalized graft polymer may be present in the nanocomposite in an amount from about 0.1 to about 99.9 weight percent based on the total weight of the nanocomposite, or from about 0.5 to about 90 weight percent, or from about 1.0 to about 80 weight percent.

The amount of epoxy-functionalized graft polymer may also be expressed in terms of the amount of epoxy-functionalized molecules that went into making the graft polymer. This method is particularly useful when the grafting process is conducted concurrently with or immediately before the formation of the nanocomposite itself. In such a case, it may be unclear what proportion of the polymeric matrix was used up in making the epoxy-functionalized graft polymer and what proportion remains as non-grafted polymer matrix. Therefore, it is useful to recite the amount of epoxy-functionalized molecule as one value and the amount of polymer matrix as another value, with the understanding that the value for the amount of polymer matrix includes the weight of both the non-grafted polymer matrix and the matrix compatible portion of the epoxy-functionalized graft polymer. Expressed in this manner, the amount of epoxy-functionalized molecule added may be from about 0.01 to about 50 weight percent based on the total weight of the epoxy-functionalized graft polymer, or from about 0.02 to about 45 weight percent, or from about 0.05 to about 40 weight percent.

Other Additives:

Although not necessarily preferred, the nanocomposite of the present invention may also include suitable additives normally used in polymers. Such additives may be employed in conventional amounts and may be added directly to the process during formation of the nanocomposite. Illustrative of such additives known in the art are colorants, pigments, carbon black, fibers (glass fibers, carbon fibers, aramid fibers), fillers, impact modifiers, antioxidants, stabilizers, flame retardants, reheat aids, crystallization aids, acetaldehyde reducing compounds, recycling release aids, oxygen scavengers, plasticizers, flexibilizers, nucleating agents, foaming agents, mold release agents, and the like, or their combinations. All these and similar additives and their use are known in the art and do not require extensive discussion. Therefore, only a limited number will be referred to, it being understood that any of these compounds can be used in any combination so long as they do not hinder the present invention from accomplishing its prime objective. In addition, the nanocomposites of this invention can be mixed with fillers, whiskers and other reinforcements, whether they are of the nano- or micro- or macro-scale. The nanocomposites may be blended with other polymers or polymeric nanocomposites or foamed by means of chemical or physical foaming agents.

Methods of Preparing Nanocomposites:

In general, standard polymer processing techniques may be used to prepare the nanocomposites of the present invention. A discussion of such techniques may be found in the following three references: *Polymer Mixing*, by C. Rauwendaal, (Carl Hanser Verlag, 1998); *Mixing and Compounding of Polymers*, by I. Manas-Zloczower and Z. Tadmor (Carl Hanser Verlag, 1994); and *Polymeric Materials Processing: Plastics, Elastomers and Composites*, by Jean-Michel Charrier (Carl Hanser Verlag, 1991), the disclosures of which is hereby incorporated by reference in its entirety. Outlined below are some suitable techniques for forming nanocomposites.

Melt blending of a polymer matrix with additives of all types is known in the art and may be used in the practice of this invention. Typically, in a melt blending operation, the polymer matrix is heated to a temperature sufficient to form a melt followed by addition of the desired amount of nano-reinforcing material, epoxy-functionalized graft polymer and other additives. The melt blend may then be subjected to shear and/or extensional mixing by mechanical means in a suitable mixer, such as an extruder, an injection molding machine, an internal mixer, an extensional flow mixer, or a continuous mixer. For example, a melt of the polymer matrix may be introduced at one end of an extruder (single or twin-screw) and the nano-reinforcing material, epoxy-functionalized graft polymer and other additives may be added to the melt all at once or in stages along the extruder. Homogenized nanocomposite is received at the other end of the extruder.

The order of addition of the various components may be important. In some instances, the epoxy-functionalized graft polymer may be added before the nano-reinforcing material to provide sufficient time for the epoxy-functionalized graft polymer to interact with the polymer matrix. In addition, particularly when the polymer matrix also serves as the matrix compatible portion of the epoxy-functionalized graft polymer, it may be desirable to add an epoxy-functionalized molecule to the polymer matrix before adding nano-reinforcing material so that there is time for the epoxy-functionalized group to be grafted on to some or all of the matrix's macromolecules. When a coupling agent is used, it has to be grafted onto the matrix compatible portion before the epoxy-functionalized molecule is added. Alternatively, it may be desirable to add an epoxy-functionalized molecule (and perhaps a coupling agent) and a nano-reinforcing material to the polymer matrix at the same time and conduct the grafting process concurrently with the formation of the nanocomposite. Such decisions are best left to one skilled in the art who may determine the best method for a given system by experimentation.

The temperature of the melt, residence time in the extruder and the design of the extruder (single screw, twin-screw, number of flights per unit length, channel depth, flight clearance, mixing zone, presence of a gear pump, extensional flow mixer, etc.) are variables that control the amount and type of stress. Shear or extensional mixing is typically maintained until the nano-reinforcing material exfoliates or delaminates to the desired extent. In general, at least about 60 percent by weight, preferably at least about 80 percent by weight, more preferably at least about 90 percent by weight and most preferably at least about 95 percent by weight of the nano-reinforcing material delaminates to form fibrils or platelet particles substantially homogeneously dispersed in the polymer matrix. In the practice of the present invention, melt blending is preferably carried out in the absence of air, as for example, in the presence of an inert gas, such as argon, neon, carbon dioxide or nitrogen. However, the present invention may be practiced in the presence of air. The melt blending operation may be conducted in a batch or discontinuous fashion but it is more preferably conducted in a continuous fashion in one or more processing machines, such as in an extruder, from which air is largely or completely excluded. The extrusion may be conducted in one zone or step or in a plurality of reaction zones in series or parallel. When necessary, the melt may be passed through an extruder more than once. Master batch technique may also be considered. Devolatilization is highly recommended.

Other methods of mixing are also available. Thermal shock shear mixing is achieved by alternatively raising or lowering the temperature of the composition causing thermal expansions and resulting in internal stresses, which cause the mixing. Pressure alteration mixing is achieved by sudden pressure changes. In ultrasonic techniques, cavitation or resonant vibrations cause portions of the composition to vibrate or to be excited at different phases and thus subjected to mixing. These methods of shearing are merely representative of useful methods, and any method known in the art for mixing intercalates may be used.

Reactive melt processing is another technique that may be used. Here the nano-reinforcing material and epoxy-functionalized graft polymer are initially dispersed in a liquid or solid monomer and/or a cross-linking agent, which will form or be used to form the polymer matrix of the nanocomposite. This dispersion can be injected into a polymer melt containing one or more polymers in an extruder or other mixing device. The injected liquid may result in a new polymer or in a chain extension, grafting or crosslinking of the polymer, initially in the melt.

In-situ polymerization is another technique for preparing a nanocomposite. The nanocomposite is formed by mixing monomers and/or oligomers with the nano-reinforcing material and the epoxy-functionalized graft polymer in the presence or absence of a solvent. Subsequent polymerization of the monomer and/or oligomer results in formation of polymer matrix for the nanocomposite. After polymerization, any solvent that is used is removed by conventional means.

Vinyl monomers are relatively easy to polymerize by different reaction mechanisms and in different media. For the preparation of nanocomposites polymerization in the presence of organoclay has been frequently used. The preferred mechanism is free radical, historically in bulk, but today mainly in emulsion or suspension, although solution polymerization has also been used. Bulk polymerization by the coordination methods is also carried out during reactive processing. Since clay intercalation is usually performed in water, the emulsion and suspension polymerization is natural, especially when the resulting latex can be directly used, as in paints, adhesives or sealants.

Solution polymerization may also be used to prepare the nanocomposites, in which the nano-reinforcing material is dispersed into the liquid medium along with epoxy-functionalized graft polymer in the presence or absence of additives. Then the mixture may be introduced into the polymer solution or polymer melt to form the nanocomposites.

Methods of Forming Nanocomposites Into Products:

Standard composite forming techniques may be used to fabricate products from the nanocomposites of the present invention. For example, melt-spinning, casting, vacuum molding, sheet molding, injection molding and extruding, melt-blowing, spun-bonding, blow-molding, overmolding, compression molding, resin transfer molding (RTM), thermo-forming, roll-forming and co- or multilayer extrusion may all be used. Examples of products include components for technical equipment, apparatus casings, household equipment, sports equipment, bottles, other containers, components for the electrical and electronics industries, components for the transport industries, and fibers, membranes and films. The nanocomposites may also be used for coating articles by means of powder coating processes or solvent coating processes or as adhesives. Mixtures of different nanoreinforcements can be used to maximize the benefits from each. In the case of conventional reinforcements like fillers, whiskers, and fibers, all standard processing techniques for conventional composites can be used for the reinforced polymer nanocomposites, including compression, vacuum bag, autoclave, filament winding, braiding, pultrusion, calendaring, etc.

The nanocomposites of the present invention may be directly molded by injection molding or heat pressure molding, or mixed with other polymers, including other copolymers. Alternatively, it is also possible to obtain molded products by performing an in situ polymerization reaction in a mold.

The nanocomposites according to the invention are also suitable for the production of sheets and panels using conventional processes such as vacuum or hot pressing. The sheets and panels can be laminated to materials such as wood, glass, ceramic, metal or other plastics, and outstanding strengths can be achieved using conventional adhesion promoters, for example, those based on vinyl resins. The sheets and panels can also be laminated with other plastic films by coextrusion, with the sheets being bonded in the molten state. The surfaces of the sheets and panels can be finished by conventional methods, for example, by lacquering or by the application of protective films.

The nanocomposites of this invention are also useful for fabrication of extruded films and film laminates, as for example, films for use in food packaging. Such films can be fabricated using conventional film extrusion techniques. The films are preferably from 10 to 100, more preferably from 20 to 100, and most preferably from 25 to 75, microns thick.

EXAMPLES

The following working examples are given to illustrate the invention and should not be construed as limiting its scope. Unless otherwise indicated, all parts and percentages are by weight.

Materials and Methods:

Layered clay is modified with quaternary amine and is commercially available from, for example, Southern Clay Products under the trade name Cloisite 10A, 15A and 30B and from Nanocor Inc. under the trade name Nanomer I44PA.

Polypropylenes (PP) 6100 SM and Pro-fax®6823 were obtained commercially from Montell and Basell, respectively. The PP 6100SM is equivalent to Pro-fax® PDC1274 of Basell.

Polyethylene-terephthalate Eastapak™ 9921 was obtained from Eastman.

Polyamide-6 Capron 8200 was obtained from Allied Signal.

Maleic anhydride grafted polypropylene (MAgPP) Epolene™ (E-43) and Polybond™ (3150) were obtained commercially from Eastman and UniRoyal Chemicals, respectively.

Glycidyl methacrylate (GMA) and styrene (STY) were obtained commercially from Aldrich and used as received.

4-glycidyloxy-N,N'-diglycidylaniline (EPOXY) (Araldite™ MY0510) was obtained from Vantico.

Peroxide initiators 1,1-(di-t-butylperoxy)-3,3,5-trimethylcyclohexane (DTC) and 2,5-dimethyl-2,5-di(tert-butylperoxy)-hexane (T101) were obtained from Aldrich and Akzo, respectively, and used as received.

Epoxy-functionalized Graft Polymers:

Example 1

Glycidyl methacrylate grafted polypropylenes were produced by reactive extrusion in a Leistritz™ 34 mm twin-screw extruder (L/D=40) using the corotating mode. A mixture of GMA and peroxide was directly fed into the molten PP at the first third of the extruder using a Shimadzu™ LC610 pump. The extrusion was performed at 180° C. at a screw rotation speed of 100 rpm and a throughput of 5 kg/h. Devolatilization was performed at 240° C. through a port situated in the last third of the extruder.

Example 2

EPOXY modified maleic anhydride grafted polypropylenes were produced by reactive extrusion in a Leistritz™ 34 mm twin screw extruder (L/D=40) using the corotating mode and high shear screw configuration. MAgPP (Polybond™ 3150) or a mixture of PP and MAgPP which was dry blended first, was then fed into the extruder. EPOXY was fed into the molten mixture of PP and MAgPP. The extrusion was performed at 200° C. at a screw rotation speed of 200 rpm and a throughput of 5 kg/h. The weight ratio between Polybond™ 3150 and EPOXY was kept in the range of from 4-25.

Example 3

Glycidyl methacrylate modified styrene grafted polypropylenes were produced by reactive extrusion in a Leistritz™ 34 mm twin-screw extruder (L/D=40) using the corotating mode. A mixture of GMA, STY and peroxide was directly fed into the molten PP at the first third of the extruder using a Shimadzu™ LC610 pump. The extrusion was performed at 180° C. at a screw rotation speed of 100 rpm and a throughput of 5 kg/h. Devolatilization was performed at 240° C. through a port situated in the last third of the extruder.

Example 4

EPOXY grafted polyamide (PA-6) is produced by reactive extrusion in a Leistritz™ 34 mm twin-screw extruder (L/D=40) using the corotating mode and high shear screw configuration. EPOXY is fed into the molten PA. The extrusion is performed at 270° C. at a screw rotation speed of 200 rpm and a throughput of 5 kg/h.

Example 5

EPOXY grafted polyethyleneterephthalate was produced by reactive extrusion in a Leistritz™ 34 mm twin screw extruder (L/D=40) using the corotating mode and high shear screw configuration. EPOXY was fed into the molten PET. The extrusion was performed at 270° C. at a screw rotation speed of 200 rpm and a throughput of 5 kg/h.

Nanocomposites:

Nanocomposites were prepared by extrusion in a Leistritz™ 34 mm twin-screw extruder (L/D=40) using the corotating mode and high shear screw configuration. A dried polymer or a pre-dry blended mixture of polymer and a coupling agent was fed into the extruder. Dried nanoclays were fed into the molten mixture of the polymer. The extrusion was performed at a temperature significantly higher than the melting temperature of the polymer (for example, for PP and PET the processing temperature was set at 200° C. and 270° C., respectively) at a screw rotation speed of 200 rpm and a throughput of 5 kg/h.

Example A

Polypropylene, Layered Clay and Glycidyl Methacrylate Grafted Polypropylene

2% by weight layered clay (Cloisite 15A)
4% by weight glycidyl methacrylate grafted polypropylene
94% by weight polypropylene

Example AA

Polypropylene, Layered Clay and EPOXY Modified Maleic Anhydride Grafted Polypropylene 2% by weight layered clay (Nanomer I44PA)
2% by weight EPOXY modified maleic anhydride grafted polypropylene (prepared from Polybond™ 3150)
96% by weight polypropylene

Comparative Example T

Polypropylene, Layered Clay and Maleic Anhydride Grafted Polypropylene

2% by weight layered clay (Cloisite 15A)
2% by weight maleic anhydride grafted polypropylene (Polybond™ 3150)
96% by weight polypropylene

Comparative Example X

Polypropylene, Layered Clay and Maleic Anhydride Grafted Polypropylene

2% by weight layered clay (Cloisite 15A)
4% by weight maleic anhydride grafted polypropylene (Polybond™ 3150)
94% by weight polypropylene

Comparative Example Y

Polypropylene and Layered Clay

2% by weight layered clay (Cloisite 15A)
98% by weight polypropylene

Comparative Example Z

Polypropylene

100% by weight polypropylene

Flexural stress, flexural modulus, tensile stress and tensile modulus of nanocomposites prepared according to Examples A and AA were compared with the corresponding properties of the comparative compositions T, X, Y and Z. Results are given in Table 3. It is evident from Table 3 that nanocomposites of the present invention (Ex. A and Ex. AA) show improvement in all four properties over related compositions that do not contain an epoxy-functionalized graft polymer.

TABLE 3

| Composition | Flexural stress (MPa) | Flexural modulus (GPa) | Tensile stress (MPa) | Tensile modulus (GPa) |
|---|---|---|---|---|
| Ex. A | 63.2 | 1.96 | 35.7 | 2.33 |
| Ex. AA | 62.8 | 1.925 | 33.2 | 2.25 |
| Comp. T | 59.2 | 1.754 | 33.4 | 2.112 |
| Comp. X | 55.4 | 1.70 | 32.5 | 2.03 |
| Comp. Y | 51.0 | 1.45 | 31.9 | 1.89 |
| Comp. Z | 50.9 | 1.38 | 31.5 | 1.75 |

Example B

Polypropylene, Layered Clay and Glycidyl Methacrylate Grafted Polypropylene

4% by weight layered clay (Cloisite 15A)
8% by weight glycidyl methacrylate grafted polypropylene
88% by weight polypropylene

Comparative Example W

Polypropylene, Layered Clay and Maleic Anhydride Grafted Polypropylene

4% by weight layered clay (Cloisite 15A)
8% by weight maleic anhydride grafted polypropylene
88% by weight polypropylene Elongation (a measure of ductility) of the nanocomposite prepared according to Example B was compared with the nanocomposite of Comparative Example W (Comp. W). The results are shown in FIG. 1. The results clearly show that besides showing lower stiffness and yield strength, the nanocomposite material using maleic anhydride grafted polypropylene breaks after only about 14.6 mm (29%) of elongation. On the other hand, the nanocomposite of the present invention elongates to over 350 mm or 700% before breaking. Clearly the nanocomposite of the present invention is more ductile than the one from the prior art.

Collectively, the results demonstrate that nanocomposites comprising an epoxy-functionalized graft polymer specifically designed to be compatible with both the polymer matrix and the layered clay have superior properties in comparison with nanocomposites of the prior art.

The invention claimed is:

1. A nanocomposite comprising:
    (a) a nano-reinforcing material;
    (b) a polymer matrix; and,
    (c) an epoxy-functionalized graft polymer compatible with the polymer matrix, the graft polymer having a matrix compatible portion and an epoxy functionalized portion.

2. The nanocomposite according to claim 1, wherein the nano-reinforcing material is layered clay, nano-fibers, nano-whiskers, carbon nanotubes, metal-oxide nanotubes, metallic oxides, metallic sulfides, metallic layered hydroxides, or a mixture thereof.

3. The nanocomposite according to claim 1, wherein the nano-reinforcing material is mineral or synthetic layered silicate.

4. The nanocomposite according to claim 1, wherein the nano-reinforcing material is a phyllosilicate.

5. The nanocomposite according to claim 1, wherein the nano-reinforcing material is bentonite, kaolinite, dickite, nacrite, stapulgite, illite, halloysite, montmorillonite, hectorite, fluorohectorite, nontronite, beidellite, saponite, volkonskoite, magadiite, medmontite, kenyaite, sauconite, muscovite, vermiculite, mica, hydromica, phegite, brammallite, celadonite, or a mixture thereof.

6. The nanocomposite according to claim 1, wherein the nano-reinforcing material is modified with quaternary, ternary, secondary or primary ammonium or phosphonium.

7. The nanocomposite according to claim 1, wherein the polymer matrix comprises a thermoplastic polymer, a thermoset polymer, an elastomer or a mixture thereof.

8. The nanocomposite according to claim 1, wherein the polymer matrix comprises an olefinic, a vinylic, a styrenic, an acrylonitrilic, an acrylic, a cellulosic, a polyamide, a thermoplastic polyester, a thermoplastic polycarbonate, a polysulfone, a polyimide, a polyether/oxide, a polyketone, a fluoropolymer, a copolymer of the foregoing, or a mixture thereof.

9. The nanocomposite according to claim 1, wherein the polymer matrix comprises an olefinic, a polyamide, a thermoplastic polyester, a thermoplastic polycarbonate, a copolymer of the foregoing, or a mixture thereof.

10. The nanocomposite according to claim 1, wherein the polymer matrix comprises an olefinic homopolymer, an olefinic copolymer, thermoplastic polyester, a polyamide, a copolymer of a polyamide, an elastomer, a copolymer of an elastomer, or a mixture thereof.

11. The nanocomposite according to claim 1, wherein the polymer matrix comprises polypropylene, polyethylene, ethylene-propylene copolymer, polyethylene-terephthalate, polyamide, or a mixture thereof.

12. The nanocomposite according to claim 1, wherein the polymer matrix comprises polypropylene.

13. The nanocomposite according to claim 1, wherein the matrix compatible portion that is the same as the polymer matrix.

14. The nanocomposite according to claim 1, wherein the epoxy-functionalized portion comprises a glycidyl group.

15. The nanocomposite according to claim 1, wherein the epoxy-functionalized graft polymer comprises a glycidyl methacrylate grafted polymer or copolymer.

16. The nanocomposite according to claim 1, wherein the epoxy-functionalized graft polymer comprises an epoxy modified-coupling agent-grafted polymer or copolymer.

17. The nanocomposite according to claim 1, wherein the epoxy-functionalized graft polymer comprises a glycidyl methacrylate grafted polypropylene.

18. The nanocomposite according to claim 1, wherein the epoxy-functionalized graft polymer comprises a glycidyl methacrylate modified styrene-grafted polypropylene.

19. The nanocomposite according to claim 1, wherein the nano-reinforcing material comprises layered clay modified with quaternary, ternary, secondary or primary ammonium or phosphonium, the polymer matrix comprises polypropylene, and the epoxy-functionalized graft polymer comprises glycidyl methacrylate grafted polypropylene.

20. The nanocomposite according to claim 1, wherein the nano-reinforcing material comprises layered clay modified with quaternary, ternary, secondary or primary ammonium or phosphonium, the polymer matrix comprises polypropylene, and the epoxy-functionalized graft polymer comprises an epoxy-modified-maleic anhydride-grafted polypropylene or an epoxy-modified-acrylic acid-grafted polypropylene.

21. The nanocomposite according to claim 1, wherein the nano-reinforcing material comprises layered clay modified with quaternary, ternary, secondary or primary ammonium or phosphonium, the polymer matrix comprises polyethylene terephthalate, and the epoxy-functionalized graft polymer comprises epoxy-functionalized polyethylene terephthalate.

22. The nanocomposite according to claim 1, wherein functional groups pendant from the epoxy-functionalized graft polymer have been fully or partially transformed into epoxy groups.

23. The nanocomposite according to claim 1, wherein the nano-reinforcing material is present in an amount of from about 0.1 to about 40 weight percent based on the total weight of the nanocomposite.

24. The nanocomposite according to claim 1, wherein the amount of nano-reinforcing material is from about 0.2 to about 30 weight percent based on the total weight of the nanocomposite.

25. The nanocomposite according to claim 1, wherein the amount of nano-reinforcing material is from about 0.5 to about 20 weight percent based on the total weight of the nanocomposite.

26. The nanocomposite according to claim 1, wherein polymer matrix is present in an amount of from about 0.1 to about 99.9 weight percent based on the total weight of the nanocomposite.

27. The nanocomposite according to claim 1, wherein the amount of polymer matrix is from about 20 to about 99.0 weight percent based on the total weight of the nanocomposite.

28. The nanocomposite according to claim 1, wherein the amount of polymer matrix is from about 40 to about 98.0 weight percent based on the total weight of the nanocomposite.

29. The nanocomposite according to claim 1, wherein the epoxy-functionalized graft polymer is present in an amount of from about 0.1 to about 99.9 weight percent based on the total weight of the nanocomposite.

30. The nanocomposite according to claim 1, wherein the amount of epoxy-functionalized graft polymer is from about 0.5 to about 90.0 weight percent based on the total weight of the nanocomposite.

31. The nanocomposite according to claim 1, wherein the amount of epoxy-functionalized graft polymer is from about 1.0 to about 80 weight percent based on the total weight of the nanocomposite.

32. A process for producing a nanocomposite comprising:
(a) selecting a polymer matrix;
(b) selecting a nano-reinforcing material;
(c) selecting an epoxy-functionalized graft polymer having a matrix compatible portion selected to be compatible with the polymer matrix and having an epoxy-functionalized portion selected to be able to interact with surface and/or modified groups of the nano-reinforcing material; and,
(d) preparing the nanocomposite.

33. The process according to claim 32, wherein the matrix compatible portion is selected based on a property of the polymer matrix, the property being selected from the group consisting of a physical property, a chemical property, chemical structure, and a combination thereof.

34. The process according to claim 32, wherein the matrix compatible portion is selected based on a property of the polymer matrix, the property being selected from the group consisting of crystallinity, hydrophobicity, cohesive energy density, capacity for dispersive interactions, capacity for polar interactions, capacity for hydrogen bonding interactions, capacity for acid/base interactions, and a combination thereof.

35. The process according to claim 32, wherein the nano-reinforcing material comprises layered clay.

36. The process according to claim 32, wherein the polymer matrix comprises a thermoplastic polymer, an elastomer or a mixture thereof.

37. The process according to claim 32, wherein the polymer matrix comprises a polyolefin.

38. The process according to claim 32, wherein the polymer matrix comprises polypropylene.

39. The process according to claim 32, wherein the epoxy-functionalized graft polymer has a matrix compatible portion which comprises a thermoplastic polymer, an elastomer or a mixture thereof.

40. The process according to claim 32, wherein the epoxy-functionalized graft polymer has a matrix compatible portion which comprises a homopolymer or copolymer of a polyolefin.

41. The process according to claim 32, wherein the epoxy-functionalized graft polymer has a matrix compatible portion which comprises polypropylene.

42. The process according to claim 32, wherein the epoxy-functionalized graft polymer has a matrix compatible portion which comprises a homopolymer or copolymer of a thermoplastic polyester or polyamide.

43. The process according to claim 32, wherein the epoxy-functionalized graft polymer has a matrix compatible portion which comprises polyethyleneterephthalate, polyamide, polyethylene, or ethylene-propylene copolymer.

44. The process according to claim 32, wherein the epoxy-functionalized graft polymer has an epoxy-functionalized portion comprising a glycidyl group.

45. The process according to claim 32, wherein the epoxy-functionalized graft polymer has an epoxy-functionalized portion comprising glycidyl methacrylate.

46. The process according to claim 32, wherein the epoxy-functionalized graft polymer has an epoxy-functionalized portion comprising diglycidyl ether of bis-phenol A, diglycidyl ether of p-aminophenol, or N,N,N',N'-tetraglycidyl-4,4'-methylene-bis-benzene amine.

47. The process according to claim 32, wherein the nanocomposite is formed by melt blending the polymer matrix, the nano-reinforcing material and the epoxy-functionalized graft polymer.

48. The process according to claim 47, wherein the melt blending is performed in an extruder, an injection molding machine, an internal mixer, an extensional mixer or a continuous mixer.

49. The process according to claim 32, wherein the polymer matrix is formed by polymerizing a monomer and/or oligomer of the polymer matrix in the presence of the nano-reinforcing material and the epoxy-functionalized graft polymer.

* * * * *